(12) United States Patent
Ling et al.

(10) Patent No.: US 11,360,268 B1
(45) Date of Patent: Jun. 14, 2022

(54) LOW-LOSS AND LOW-CROSSTALK OPTICAL MODE MULTIPLEXER AND OPTICAL CROSSOVER

(71) Applicant: Cisco Technology, Inc., San Jose, CA (US)

(72) Inventors: Tao Ling, Breinigsville, PA (US); Shiyi Chen, Breinigsville, PA (US); Ravi S. Tummidi, Breinigsville, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/249,893

(22) Filed: Mar. 17, 2021

(51) Int. Cl.
| | |
|---|---|
| *H04J 14/04* | (2006.01) |
| *G02B 6/293* | (2006.01) |
| *H04B 10/2581* | (2013.01) |
| *H04B 10/80* | (2013.01) |

(52) U.S. Cl.
CPC ....... *G02B 6/2938* (2013.01); *H04B 10/2581* (2013.01); *H04B 10/801* (2013.01)

(58) Field of Classification Search
CPC ........ H04J 14/04; H04J 14/02; H04J 14/0212; H04B 10/2581; G02B 6/2938; G02B 6/0288; G02B 6/29343; H04Q 11/0005; H04Q 11/0062
USPC .... 398/44, 79, 158, 159, 83, 82, 45, 48, 49, 398/141, 143; 385/24, 28, 31, 16, 17, 18, 385/124, 129
See application file for complete search history.

(56) References Cited

U.S. PATENT DOCUMENTS

| | | | | |
|---|---|---|---|---|
| 8,693,834 B2* | 4/2014 | Bickham | ............. | G02B 6/0365 385/127 |
| 9,791,761 B1* | 10/2017 | Li | ............. | G02F 1/025 |
| 10,222,549 B2* | 3/2019 | Tu | ............. | G02B 6/14 |
| 2006/0083461 A1 | 4/2006 | Takahashi et al. | | |
| 2014/0199065 A1* | 7/2014 | Bratkovski | ............. | H04J 14/04 398/44 |
| 2015/0188659 A1* | 7/2015 | Lipson | ............. | H04J 14/02 398/44 |
| 2017/0227712 A1 | 8/2017 | Kato et al. | | |

(Continued)

OTHER PUBLICATIONS

Omar Faruk Rasel, Akira Yamauchi, Takaaki Ishigure, "Low-Loss 3-Dimensional Shuffling Graded-Index Polymer Optical Waveguides for Optical Printed Circuit Boards," ResearchGate, Jul. 2018, 10 pages.

(Continued)

*Primary Examiner* — Hanh Phan
(74) *Attorney, Agent, or Firm* — Patterson + Sheridan, LLP (57) ABSTRACT

Aspects described herein include a mode multiplexer comprising a first optical waveguide extending between a first port and a second port. A first input mode of an optical signal entering the first port is propagated through the first optical waveguide to the second port. The mode multiplexer further comprises a second optical waveguide configured to evanescently couple with a coupling section of the first optical waveguide. A second input mode of the optical signal entering the first port is propagated through the second optical waveguide to a third port. The first optical waveguide further defines a filtering section between the coupling section and the second port, the filtering section configured to filter the second input mode.

17 Claims, 7 Drawing Sheets

(56) References Cited

U.S. PATENT DOCUMENTS

2019/0258003 A1    8/2019    Shinohara et al.
2020/0225412 A1    7/2020    Gonz Lez Andrade et al.

OTHER PUBLICATIONS

Steven G. Johnson, Christina Manolatou, Shanhui Fan, Pierre R. Villeneuve, J. D. Joannopoulos, and H. A. Haus, "Elimination of cross talk in waveguide intersections," Optics Letters, vol. 22, isssue 23, pp. 1855-1857 (1998).

Chunlei Sun, Yu Yu, Mengyuan Ye, Guanyu Chen & Xinliang Zhang, "An ultra-low crosstalk and broadband two-mode (de)multiplexer based on adiabatic couplers," Scientific Reports, vol. 6, Article No. 38494 (2016).

Long Chen and Young-kai Chen," Compact, low-loss and low-power 8×8 broadband silicon optical switch," Optics Express, vol. 20, issue17, pp. 18977-18985 (2012).

Tatsuhiko Fukazawa, Tomohisa Hirano, Fumiaki Ohno and Toshihiko Baba, "Low Loss Intersection of Si Photonic Wire Waveguides," Japanese Journal of Applied Physics, vol. 43, No. 2R, 2004.

Y. Luo et al., "Low-loss low-crosstalk silicon rib waveguide crossing with tapered multimode-interference design," The 9th International Conference on Group IV Photonics (GFP), San Diego, CA, USA, 2012, pp. 150-152, doi: 10.1109/GROUP4.2012.6324116.

Hongnan Xu et al., "Silicon Integrated Nanophotonic Devices for On-Chip Multi-Mode Interconnects," Applied Sciences, Accepted: Sep. 11, 2020; Published: Sep. 12, 2020, 38 pages.

\* cited by examiner

LOW-LOSS AND LOW-CROSSTALK OPTICAL MODE MULTIPLEXER AND OPTICAL CROSSOVER

TECHNICAL FIELD

Embodiments presented in this disclosure generally relate to optical networking, and more specifically, to implementations of multiple waveguide-based optical mode multiplexers and optical crossovers.

BACKGROUND

As bandwidth requirements increase in optical networks, mode multiplexers and optical crossovers have a greater prevalence in optical devices. Mode multiplexers generally permit scaling of on-chip bandwidth by utilizing the spatial modes of optical waveguides to carry multiple optical signals simultaneously. Optical crossovers are generally used to route the optical interconnects in cross-grid form to achieve large-scale, high-volume photonic circuits.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a mode multiplexer comprising a first optical waveguide extending between a first port and a second port. A first input mode of an optical signal entering the first port is propagated through the first optical waveguide to the second port. The mode multiplexer further comprises a second optical waveguide configured to evanescently couple with a coupling section of the first optical waveguide. A second input mode of the optical signal entering the first port is propagated through the second optical waveguide to a third port. The first optical waveguide further defines a filtering section between the coupling section and the second port, the filtering section configured to filter the second input mode.

One embodiment presented in this disclosure is an optical crossover comprising a first optical waveguide extending between a first port and a second port. A first input mode of a first optical signal entering the first port is propagated through the first optical waveguide to the second port. The first optical waveguide comprises a multimode optical waveguide section. The optical crossover further comprises one or more mode multiplexers, each defining a respective second optical waveguide that is configured to evanescently couple an input mode of a respective input optical signal onto a respective mode of the multimode optical waveguide section that is distinct from the first input mode. The optical crossover further comprises one or more mode demultiplexers, each defining a respective third optical waveguide that is configured to evanescently couple a respective mode of the multimode optical waveguide section onto an output mode of a respective output optical signal. The first optical waveguide further defines a filtering section arranged between the multimode optical waveguide section and the second port, the filtering section configured to filter input modes other than the first input mode.

One embodiment presented in this disclosure is a method comprising receiving an optical signal at a first port of a first optical waveguide, propagating a first input mode of the optical signal through the first optical waveguide to a second port, and evanescently coupling a second input mode of the optical signal from a coupling section of the first optical waveguide into a second optical waveguide. The second input mode is propagated through the second optical waveguide to a third port, Propagating the first input mode of the optical signal through the first optical waveguide to the second port comprises filtering the second input mode from the optical signal using a filtering section between the coupling section and the second port.

Example Embodiments

According to embodiments described herein, a mode multiplexer comprises a first optical waveguide extending between a first port and a second port. A first input mode of an optical signal entering the first port is propagated through the first optical waveguide to the second port. The mode multiplexer further comprises a second optical waveguide configured to evanescently couple with a coupling section of the first optical waveguide. A second input mode of the optical signal entering the first port is propagated through the second optical waveguide to a third port. The first optical waveguide further defines a filtering section between the coupling section and the second port. The filtering section is configured to filter at least the second input mode. In some embodiments, the filtering section comprises a taper section and/or an S-bend section. By using the filtering section, the mode multiplexer may achieve a loss that is less than 0.1 or 0.2 decibels (dB) and a crosstalk that is less than −27 dB across the O-band.

In some embodiments, multiple instances of the mode multiplexer described above may be arranged to form an optical crossover. In some embodiments, two instances of the mode multiplexer may be arranged in a back-to-back configuration, such that one or more instances are configured to operate as mode multiplexer(s), and one or more instances are configured to operate as mode demultiplexer(s). In some embodiments, the optical crossover comprises a multimode optical waveguide section, and the respective second optical waveguides of the mode multiplexer(s) evanescently couple an input mode of a respective input optical signal onto a respective mode of the multimode optical waveguide section that is distinct from the first input mode. The mode demultiplexer(s) may further comprise respective third waveguides that evanescently couple a respective mode of the multimode optical waveguide section onto an output mode of a respective optical signal.

In some embodiments, the one or more mode multiplexers and the one or more mode demultiplexers achieve the optical crossover function using different orders of modes (e.g., fundamental, first, second, and higher orders). In some embodiments, the optical crossover may be implemented as a multi-stage optical crossover. Beneficially, the optical crossover permits a more flexible waveguide routing within the optical device.

Figure 1:
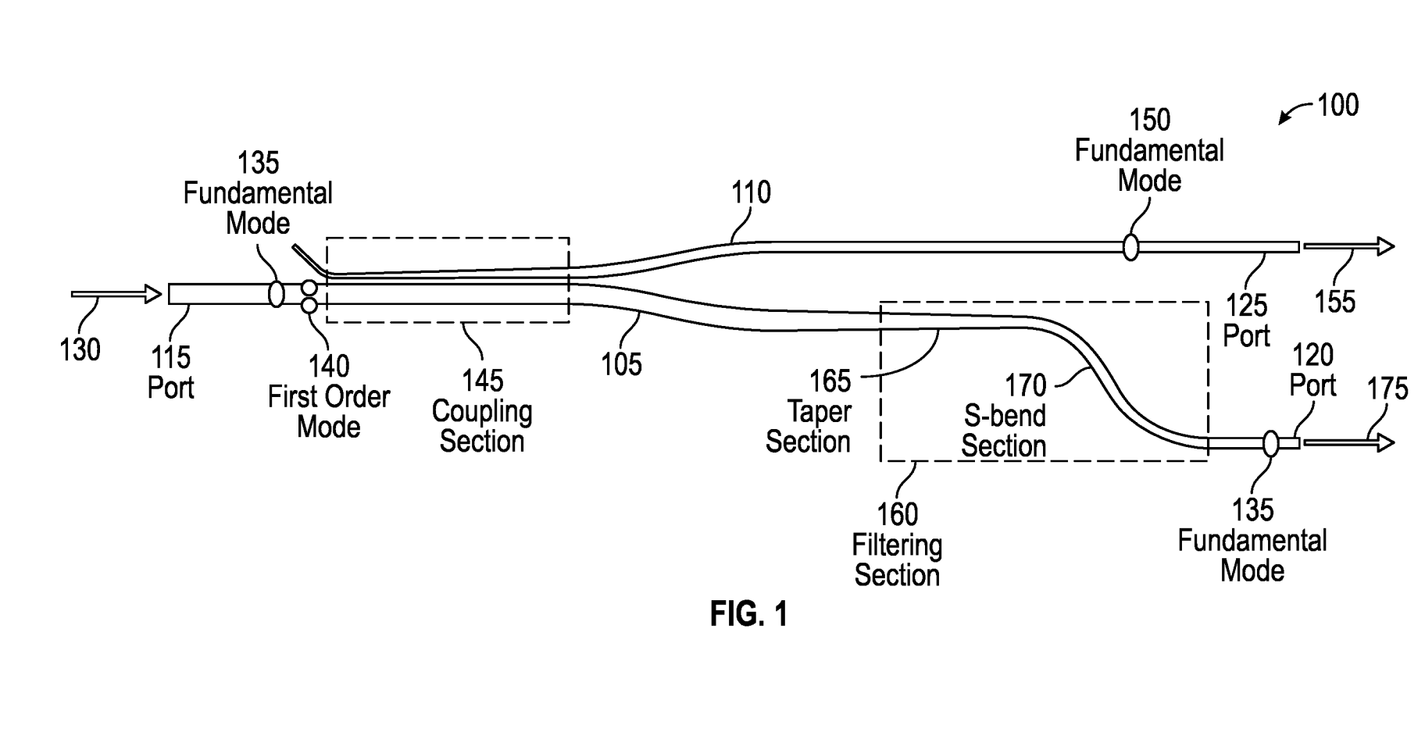
FIG. 1 is a diagram of a multiple waveguide-based mode multiplexer, according to one or more embodiments.

FIG. 1 is a diagram of a multiple waveguide-based mode multiplexer 100, according to one or more embodiments. The waveguide-based mode multiplexer 100 comprises a first optical waveguide 105 arranged proximately to a second optical waveguide 110. The first optical waveguide 105 and the second optical waveguide 110 may be formed of any semiconductor material(s) suitable for propagating light, such as monocrystalline silicon, silicon nitride, polysilicon, and so forth. In some embodiments, the first optical waveguide 105 and the second optical waveguide 110 are formed in a layer of a silicon-on-insulator (SOI)-based device. For example, the first optical waveguide 105 and the second optical waveguide 110 may be formed in an active (silicon) layer of an SOI wafer, a silicon nitride layer deposited above the active layer, and so forth.

The first optical waveguide 105 extends from a first port 115 to a second port 120, and an optical signal 130 is received at the first port 115. As discussed herein, the optical signal 130 includes one or more modes, such as one or more transverse electric (TE) modes and/or one or more transverse magnetic (TM) modes. The one or more modes of the optical signal 130 may include a fundamental mode (TE0, TM0), a first order mode (TE1, TM1), a second order mode, or higher-order modes. The order of the mode may refer to and/or be indicative of a spatial symmetry of the light energy in the optical signal 130 relative to a central axis of propagation. A fundamental mode of the optical signal 130 typically includes a single concentration of light energy that is centrally located on the axis of propagation.

When the optical signal 130 is received at the first port 115, a first input mode of the optical signal 130 is propagated through the first optical waveguide 105 to the second port 120. As shown, a fundamental mode 135 (e.g., TE0) of the optical signal 130 propagates to the second port 120, although other order modes are also contemplated.

The first optical waveguide 105 and the second optical waveguide 110 are dimensioned and arranged such that the second optical waveguide 110 evanescently couples with a coupling section 145 of the first optical waveguide 105. In some embodiments, a second input mode of the optical signal 130 entering the first port 115 is evanescently coupled into the second optical waveguide 110, such that light from the optical signal 130 propagates through the second optical waveguide 110 to a third port 125. As shown, a first order mode 140 (e.g., TE1) of the optical signal 130 evanescently couples to the second optical waveguide 110, although other order modes are also contemplated.

In some embodiments, evanescently coupling the second input mode into the second optical waveguide 110 operates to convert the mode of the optical signal 130 within the second optical waveguide 110, such that the optical signal 155 exiting the third port 125 includes the converted mode. As shown, evanescently coupling the first order mode 140 into the second optical waveguide 110 converts the first order mode 140 to a fundamental mode 150, although other order modes are also contemplated.

The first optical waveguide 105 further defines a filtering section 160 between the coupling section 145 and the second port 120. The filtering section 160 is configured to filter one or more input modes of the optical signal 130, e.g., other than the fundamental mode 135. In some embodiments, the filtering section 160 comprises a taper section 165 that tapers away from the coupling section 145 toward the second port 120. For example, for the direction of propagation of the optical signal 130 shown in FIG. 1, the taper section 165 has a wider width at an entry of the optical signal 130 and a narrower width at an exit of the optical signal 130. The tapering of the taper section 165 may be effective to filter (or mitigate) input modes other than the fundamental mode 135. Other tapering is also contemplated, such as tapering a height of the first optical waveguide 105 along the direction of propagation of the optical signal 130. Further, the taper section 165 may be contoured to filter one or more specific input modes. The dimensions of the taper section 165 may have any suitable dimensioning according to the design of the waveguide-based mode multiplexer 100.

In some embodiments, the filtering section 160 further comprises an S-bend section 170 between the taper section 165 and the second port 120. The dimensions of the filtering section 160 may have any suitable dimensioning according to the design of the waveguide-based mode multiplexer 100. In some cases, each of the taper section 165 and the S-bend section 170 may operate to selectively propagate one input mode (e.g., the fundamental mode 135) while selectively mitigating other input mode(s) such as the first order mode 140. In some embodiments, an optical signal 175 that includes the selectively propagated mode exits the second port 120.

Described another way, some implementations of the filtering section 160 include only a taper section 165, some implementations of the filtering section 160 include only an S-bend section 170, and some implementations of the filtering section 160 include both a taper section 165 and a S-bend section 170. Further, in an alternate implementation, the S-bend section 170 may be arranged before the taper section 165 within the filtering section 160.

Figure 2:
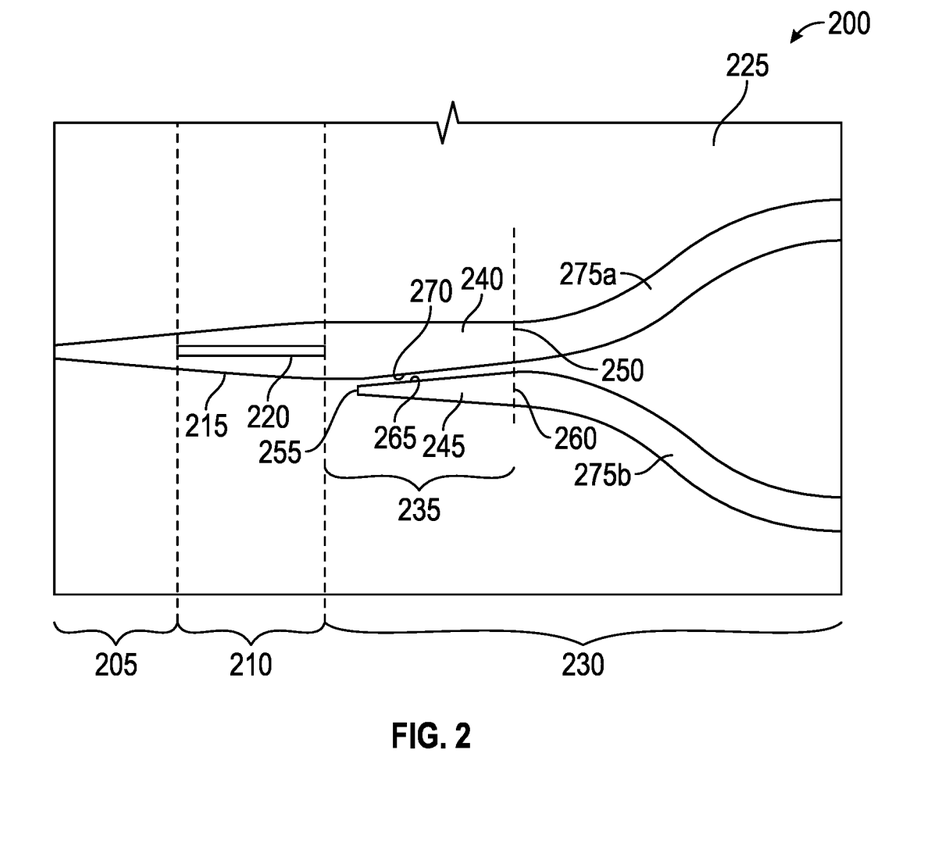
FIG. 2 is a diagram of an optical waveguide structure usable in a mode multiplexer, according to one or more embodiments.

FIG. 2 is a diagram of an optical waveguide structure 200 usable in a mode multiplexer, according to one or more embodiments. The features illustrated in FIG. 2 may be used in conjunction with other embodiments. For example, the optical waveguide structure 200 may represent an example implementation of the coupling section 145 of FIG. 1.

The optical waveguide structure 200 comprises a nano-taper 205 (which may also be referred to as an inverse taper) that couples a pair of orthogonally-polarized optical signals that are received from an external source to the optical waveguide structure 200. In some embodiments, the external source and the optical waveguide structure 200 are co-planar and the orthogonally-polarized optical signals are received through direct or end-fire coupling. The nanotaper 205 concentrates the orthogonally-polarized optical signals as a fundamental mode (TE0) optical signal and a fundamental mode (TM0) optical signal.

The optical waveguide structure 200 further comprises a rotator 210 that is configured to convert or rotate the fundamental mode TM0 optical signal into a first order mode (TE1) optical signal, and to maintain the fundamental mode TE0 optical signal. The rotator 210 may perform the conversion and maintenance of the TE0 and TM0 optical signals, respectively, as the TE0 and TM0 optical signals propagate through the rotator 210.

The rotator 210 comprises a base portion 215 and a rib portion 220. The base portion 215 may be a generally planar structure that that may be co-planar with the nanotaper 205. In addition, the base portion 215 may inversely taper or have a width that increases from a first width substantially equal to the width of the nanotaper 205 (e.g., 300-400 nm) to a second width (e.g., 1 um), although other values of the first width and second width are contemplated.

In some embodiments, the rib portion 220 is a relatively thin strip of material that is disposed on, or that extends or protrudes from, a planar surface of the base portion 215 that is opposite an opposing planar surface of the base portion 215 in contact with the substrate 225.

As shown in FIG. 2, the rib portion 220 may extend an entire length of the rotator 210 substantially in the direction of propagation. In alternate implementations, the rib portion 220 may not extend the entire length of the rotator 210. In still other example configurations, the rib portion 220 may extend over the nanotaper 205 so that at least a portion of the nanotaper 205 includes a rib portion extending from a planar surface of the nanotaper 205.

The rib portion 220 may have a width that is less or substantially less than any of the widths of the base portion 215. In some implementations, the width of the rib portion 220 may be substantially uniform as the rib portion 220 extends. For example, the uniform width of the rib portion 220 may be about 150 nm, although other widths are also contemplated. In alternate implementations, the rib portion 220 has a width that varies as the rib portion 220 extends. For example, the width of the rib portion 220 may taper similar to, or in the same direction, as the tapering of the base portion 215. In another example, the width of the rib portion 220 may taper in the opposite direction as the tapering of the base portion 215.

The optical waveguide structure 200 further comprises a separator 230 that is configured to separate the TE0 optical signal and the TE1 optical signal into separate optical waveguides or waveguide paths. The separator 230 comprises an asymmetric Y-splitter 235 that is asymmetric relative to the direction of propagation. In some embodiments, the asymmetric Y-splitter 235 comprises a dual waveguide structure in which a first optical waveguide receives the TE0 and TE1 optical signals, and a second optical waveguide couples away the TE1 optical signal from the first optical waveguide and converts TE1 mode into TE0 mode, so that the original TE0 and TE1 optical signals are directed onto separate optical waveguide paths.

As shown in FIG. 2, the asymmetric Y-splitter 235 may include a first taper section 240 and a second taper section 245. The first taper section 240 may abut or connect to the output of the rotator 210. The first taper section 240 may taper down from a first width at the output of the rotator 210 to a second width at a second end 250. The second taper section 245 may inversely taper or increase in width from a first end 255 having a small width or converging at a point, to a second end 260 having a width that may be different than the width of the first taper section 240 at the second end 250.

In some embodiments, the widths of the first taper section 240 and the second taper section 245 are selected so that the second taper section 245 couples either the TE0 optical signal or the TE1 optical signal away from the first taper section 240, while the other of the TE0 optical signal or the TE1 optical signal remains coupled to the first taper section 240. In this way, the TE0 optical signal and the TE1 optical signal are in separate optical waveguide paths at the second ends 250, 260 to achieve modal diversity. Thus, in some embodiments, a first optical waveguide comprises a first taper section 240 that is arranged adjacent to a complementary second taper section 245 of a second optical waveguide.

In cases where the width of the first taper section 240 at the second end 250 is larger than the width of the second taper section 245 at the second end 260, as shown in FIG. 2, the TE0 optical signal may remain coupled to the first taper section 240 and the TE1 optical signal may be coupled to the second taper section 245. In an alternate implementation, the width of the first taper section 240 at the second end 250 may be smaller than the width of the second taper section 245 at the second end 260, such that the TE1 optical signal remains coupled to the first taper section 240 and the TE0 optical signal is coupled to the second taper section 245.

Although described in terms of coupling substantially all of the energy of the TE0 optical signal into a selected one of the first taper section 240 and the second taper section 245, and substantially all of the energy of the TE1 optical signal into the other of the first taper section 240 and the second taper section 245, alternate implementations may direct different proportions of the energies of the TE0 optical signal and the TE1 optical signal into the first taper section 240 and the second taper section 245. Further, in alternate implementations, the optical waveguide structure 200 may include the asymmetric Y-splitter 235 while omitting the rotator 210.

As shown in FIG. 2, the second taper section 245 includes a side 265 that faces and extends substantially parallel to a side 270 of the first taper section 240. The sides 265, 270 are spaced apart from each other by an appropriate distance or spacing so that coupling away of the TE1 optical signal to the second taper section 245 may be achieved. Additionally, coupling portions 275a, 275b, which may include S-bends, other curved structures, and/or straight structures, may be coupled to the second ends 250, 260 to widen the separate optical waveguide paths for transmitting the TE0 optical signal and the TE1 optical signal, which finally has been converted into TE0 mode.

In some embodiments, one or more components of the optical waveguide structure 200 are implemented as adiabatic structures. That is, the one or more components may have lengths selected such that the different functions (such as splitting and coupling of the optical signals) are performed with minimal energy loss and high isolation as the optical signals propagate through the optical waveguide structure 200. The lengths may be significantly greater than the wavelengths of the optical signals, and in some cases may be relatively greater for closer index values of the different modes. In some embodiments, the lengths of the adiabatic structures may be at least ten times greater than the wavelengths of the optical signals.

Figure 3:
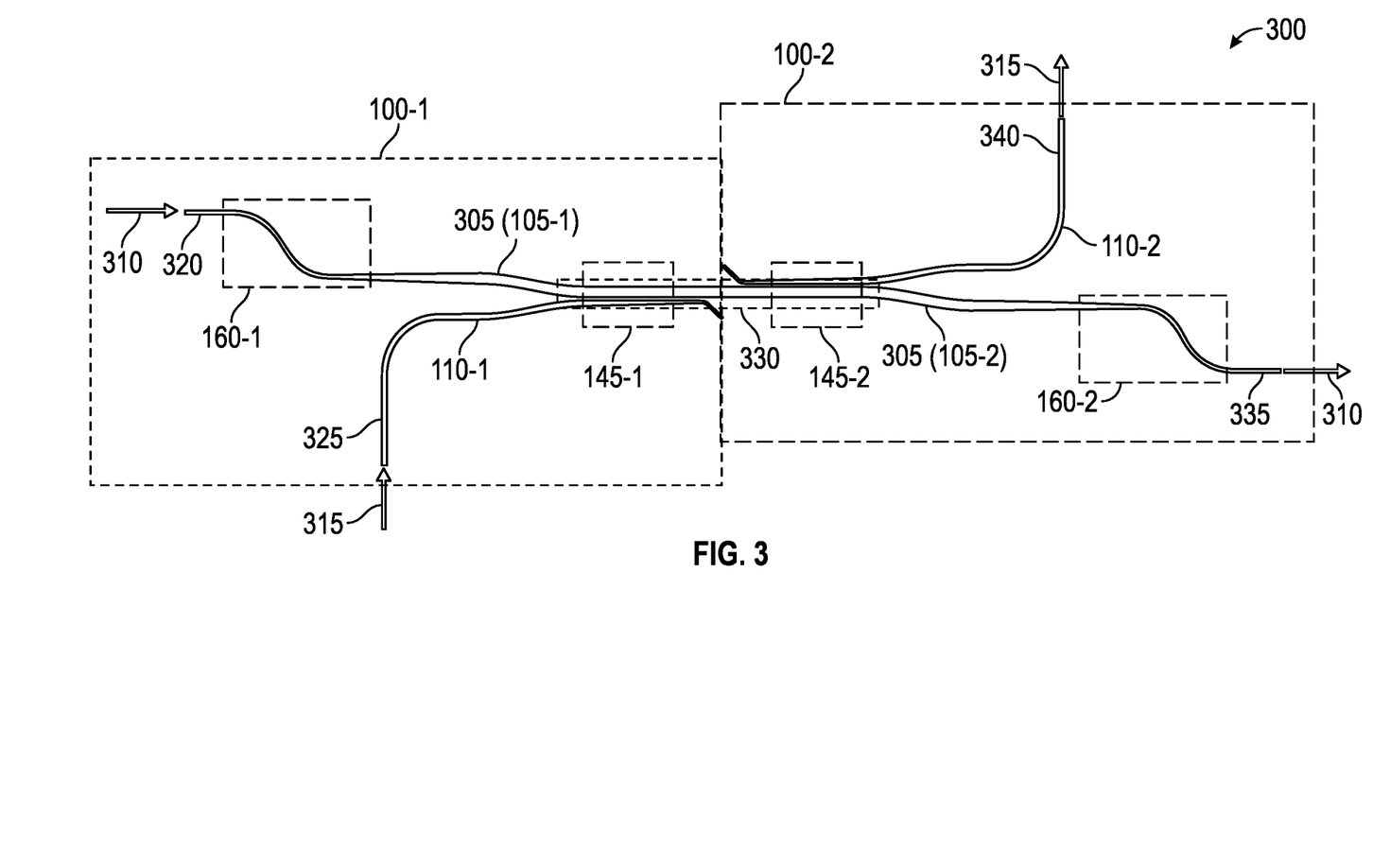
FIG. 3 is a diagram of an optical crossover having one or more mode multiplexers and one or more mode demultiplexers, according to one or more embodiments.

FIG. 3 is a diagram of an optical crossover 300 having one or more mode multiplexers and one or more mode demultiplexers, according to one or more embodiments. The optical crossover 300 may be used in conjunction with other embodiments. For example, the optical crossover 300 may include multiple instances of the mode multiplexer 100 depicted in FIG. 1.

The optical crossover 300 is implemented as a 2×2 crossover having two mode multiplexers 100-1, 100-2 (each representing an instance of the mode multiplexer 100) are arranged in a back-to-back configuration. In this configuration, the mode multiplexer 100-1 receives two optical signals 310, 315 and operates as a mode multiplexer, while the mode multiplexer 100-2 outputs the two optical signals 310, 315 and operates as a mode demultiplexer.

In the optical crossover 300, a first optical waveguide 305 extends from a first port 320 to a second port 335. The first optical waveguide 305 may thus be representative of multiple instances of the first optical waveguide 105 of FIG. 1, e.g., as first optical waveguides 105-1, 105-2 corresponding to the mode multiplexers 100-1, 100-2. The first optical waveguide 305 further comprises a filtering section 160-1 near the first port 320, and a filtering section 160-2 near the second port 335 (each representing an instance of the filtering section 160 of FIG. 1). In other implementations, the first optical waveguide 305 may omit the filtering section 160-1 or the filtering section 160-2. Each of the filtering sections 160-1, 160-2 is configured to filter one or more input modes. In some embodiments, the filtering sections 160-1, 160-2 filter input modes other than a fundamental mode of the optical signals 310, 315.

The mode multiplexer 100-1 further comprises a second optical waveguide 110-1, and the mode multiplexer 100-2 further comprises a second optical waveguide 110-2 (each representing an instance of the second optical waveguide 110 of FIG. 1). The optical signal 315 is received at a third port 325 of the second optical waveguide 110-1, evanescently couples into the first optical waveguide 305 at a coupling section 145-1, evanescently couples into the second optical waveguide 110-2 at a coupling section 145-2, and exits a fourth port 340 of the second optical waveguide 110-2.

In some embodiments, the first optical waveguide 305 comprises a multimode optical waveguide section 330 that extends through the respective coupling sections 145-1, 145-2 of the mode multiplexers 100-1, 100-2. During operation of the optical crossover 300, the mode multiplexer 100-1 couples (or maps) the optical signals 310, 315 onto respective modes of the multimode optical waveguide section 330 to propagate simultaneously to the mode multiplexer 100-2. In some embodiments, each of the optical signals 310, 315 are received as fundamental mode optical signals, and the optical signal 310 is coupled onto a fundamental mode of the multimode optical waveguide section 330. The fundamental mode of the optical signal 315 is converted at the coupling section 145-1 to a first order mode, and is coupled onto the first order mode of the multimode optical waveguide section 330. However, in other implementations, one or both of the optical signals 310, 315 may be received as input modes other than a fundamental mode. Further, conversion of the optical signal 315 may be to a mode other than the first order mode.

In the mode multiplexer 100-2, the first optical waveguide 305 propagates the fundamental mode of the optical signal 310 to the second port 335, and the first order mode of the optical signal 315 is evanescently coupled into the second optical waveguide 110-2. In some embodiments, the optical signal 315 is converted at the coupling section 145-2 from the first order mode to a fundamental mode, propagates along the second optical waveguide 110-2, and exits the fourth port 340 as a fundamental mode optical signal 315.

As discussed above, the multimode optical waveguide section 330 may simultaneously propagate multiple optical signals 310, 315 on different modes. In some alternate implementations, the coupling section 145-2 may perform a different mode conversion of the optical signal 315. In some alternate embodiments, the optical signal 310 is received as a first mode and the optical signal 315 is received as a different second mode, which may or may not be converted when coupled onto multimode optical waveguide section 330. For example, the first mode of the optical signal 310 may be a fundamental mode and the second mode of the optical signal 315 is a higher-order mode. Although the optical signals 310, 315 are shown as propagating from left to right in the optical crossover 300, in some alternate embodiments, one or both of the optical signals 310, 315 may be propagated in the reverse direction (e.g., from the second port 335 to the first port 320, or from the fourth port 340 to the third port 325).

Figure 4:
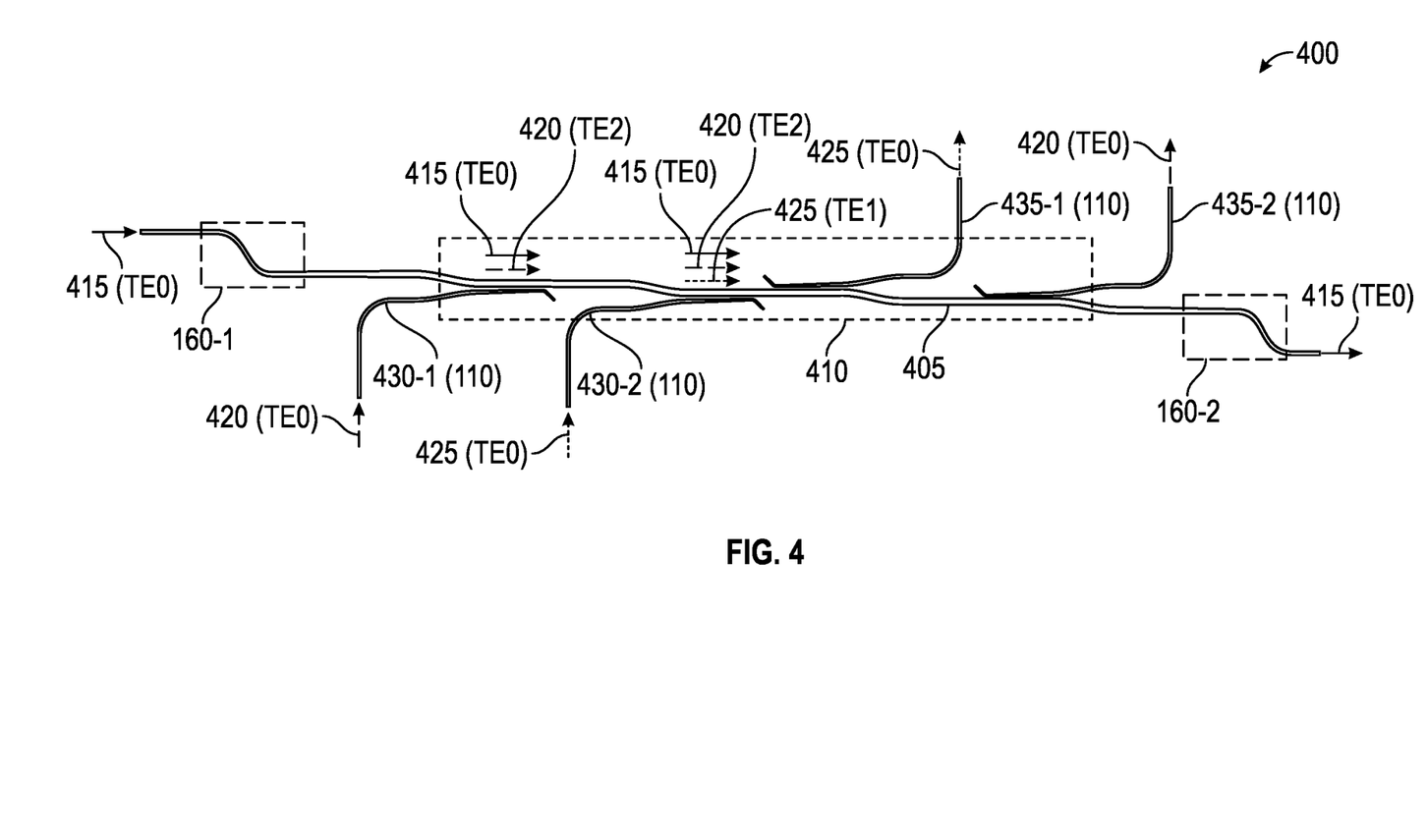
FIG. 4 is a diagram of a multiple-stage optical crossover, according to one or more embodiments.

FIG. 4 is a diagram of a multiple-stage optical crossover 400, according to one or more embodiments. The optical crossover 400 may be used in conjunction with other embodiments. For example, the optical crossover 400 may include multiple instances of the mode multiplexer 100 depicted in FIG. 1.

As shown, the optical crossover 400 is implemented as a 3×3 crossover. The optical crossover 400 comprises a first optical waveguide 405 that includes a multimode optical waveguide section 410. The first optical waveguide 405 receives a first optical signal 415 as a fundamental mode (TE0) optical signal, which is propagated through a filtering section 160-1. The optical crossover 400 further comprises a first mode multiplexer 430-1 configured to receive a second optical signal 420 as a fundamental mode (TE0) optical signal and evanescently coupled with the first optical waveguide 405, and a second mode multiplexer 430-2 configured to receive a third optical signal 425 as a fundamental mode (TE0) optical signal and evanescently coupled with the first optical waveguide 405.

The first optical signal 415 is coupled onto a fundamental mode of the multimode optical waveguide section 410. The first mode multiplexer 430-1 converts the fundamental mode of the second optical signal 420 into a second order mode (TE2) and couples the second optical signal 420 onto a second order mode of the multimode optical waveguide section 410. The second mode multiplexer 430-2 converts the fundamental mode of the third optical signal 425 into a first order mode (TE1) and couples the third optical signal 425 onto a first order mode of the multimode optical waveguide section 410.

The optical crossover 400 further comprises a first mode demultiplexer 435-1 and a second mode demultiplexer 435-2 that are evanescently coupled with the multimode optical waveguide section 410. The third optical signal 425 is converted by the first mode demultiplexer 435-1 from the first order mode to the fundamental mode and output by the first mode demultiplexer 435-1. The second optical signal 420 is converted by the second mode demultiplexer 435-2 from the second order mode to the fundamental mode and output by the second mode demultiplexer 435-2. The fundamental mode of the first optical signal 415 is propagated through a filtering section 160-2 to filter any optical energy from the first order mode (TE1) and the second order mode (TE2) optical signals, and the fundamental mode of the first optical signal 415 is output by the first optical waveguide 405.

Although the stages of the optical crossover 400 are shown as being symmetrically ordered (multiplexing the optical signals 415, 420, 425 and then demultiplexing the optical signals 425, 420, 415), other orderings are also contemplated. In some embodiments, the mode multiplexers 430-1, 430-2 and the mode demultiplexers 435-1, 435-2 for each mode of the multimode optical waveguide section 410 are interspersed. In one example, the stages are arranged to multiplex the optical signals 415, 425, 420 and then demultiplex the optical signals 425, 420, 415 in a different order.

In another example, the stages are arranged to multiplex the optical signal 415, 420, demultiplex the optical signal 420, multiplex the optical signal 425, and demultiplex the optical signals 425, 415. Other arrangements of the stages are also contemplated.

Further, in some implementations, some or all of the mode multiplexers 430-1, 430-2 and the mode demultiplexers 435-1, 435-2 may or may not perform mode conversion. For example, the second optical signal 420 may be received at the first mode multiplexer 430-1 as a second order mode and the third optical signal 425 may be received at the second mode multiplexer 430-2 as a first order mode.

Figure 5:
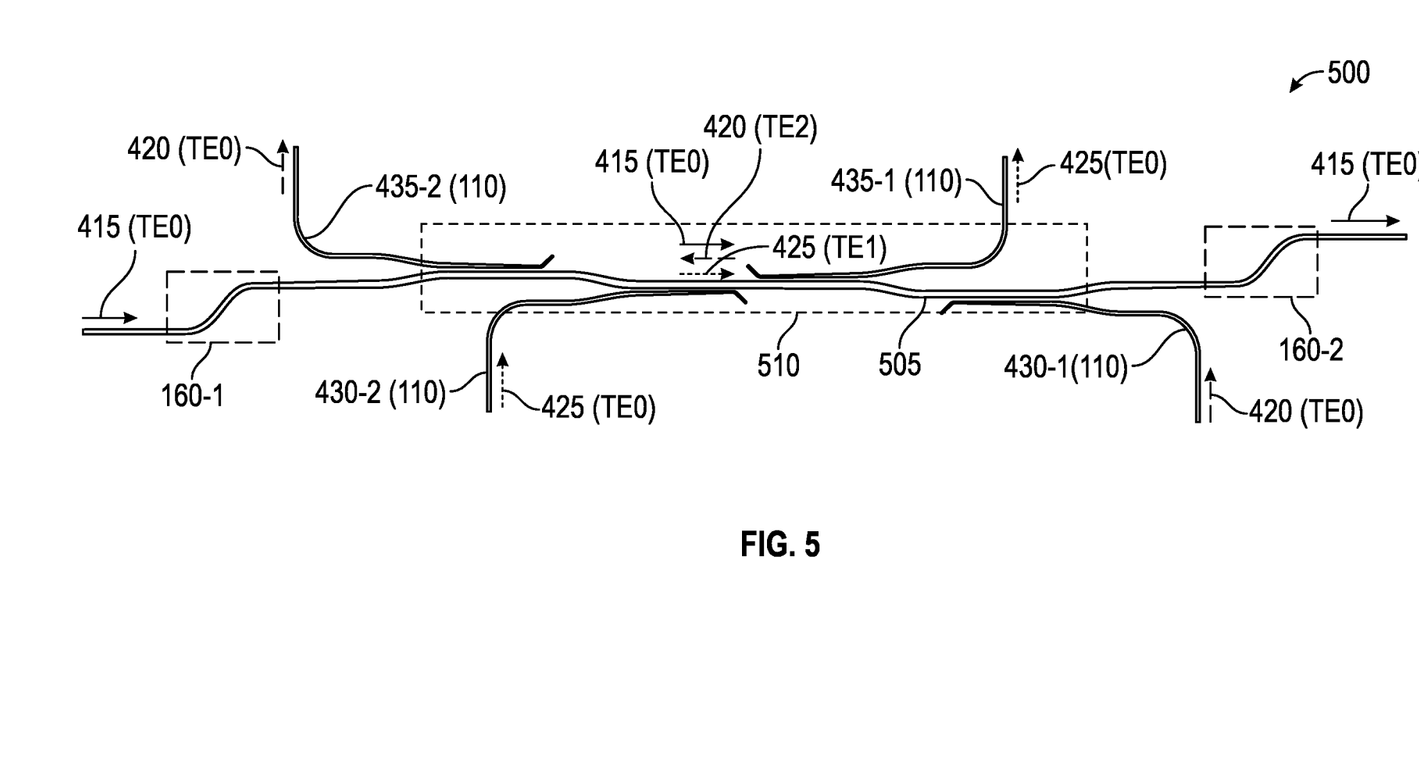
FIG. 5 is a diagram of a multiple-stage optical crossover supporting bidirectional optical signal transmission, according to one or more embodiments.

FIG. 5 is a diagram of a multiple-stage optical crossover 500 supporting bidirectional optical signal transmission, according to one or more embodiments. The optical crossover 500 may be used in conjunction with other embodiments. For example, the optical crossover 500 may include multiple instances of the mode multiplexer 100 depicted in FIG. 1.

As shown, the optical crossover 500 is implemented as a 3×3 crossover. The optical crossover 500 comprises a first optical waveguide 505 that includes a multimode optical waveguide section 510. The first optical waveguide 505 receives the first optical signal 415 as a fundamental mode (TE0) optical signal, which is propagated through a filtering section 160-1. Proceeding from left to right in FIG. 5, the optical crossover 500 further comprises the second mode demultiplexer 435-2 extending to a first side of the first optical waveguide 505, the second mode multiplexer 430-2 extending to a second side of the first optical waveguide 505 opposite the first side, the first mode demultiplexer 435-1 extending to the first side, and the first mode multiplexer 430-1 extending tot the second side. The first optical waveguide 505 then extends through a filtering section 160-2.

In the optical crossover 500, the optical signals 415, 425 propagate through the multimode optical waveguide section 510 from left to right, and the optical signal 420 propagates through the multimode optical waveguide section 510 from right to left. However, alternate implementations may have any of the optical signals 415, 420, 425 propagating in different directions. Further, while the first mode demultiplexer 435-1 and the second mode demultiplexer 435-2 extend to the first side, and the first mode multiplexer 430-1 and the second mode multiplexer 430-2 extend to the second side, alternate implementations may have one or more mode multiplexers and one or more mode demultiplexers extending to a particular side of the first optical waveguide 505.

Figure 6:
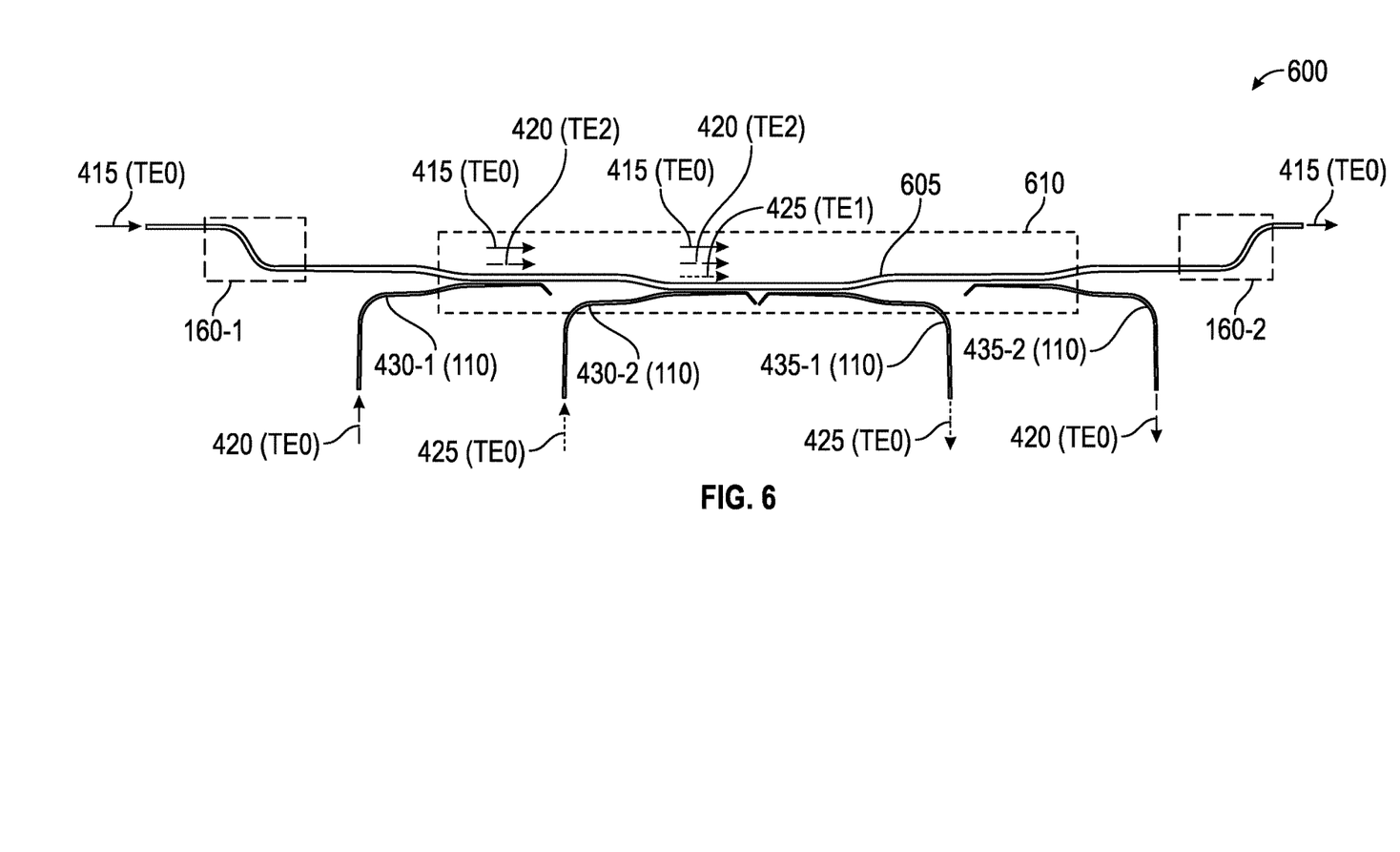
FIG. 6 is a diagram of a multiple-stage optical crossover having optical waveguides extending to a same side, according to one or more embodiments.

FIG. 6 is a diagram of a multiple-stage optical crossover 600 having optical waveguides extending to a same side, according to one or more embodiments. The optical crossover 600 may be used in conjunction with other embodiments. For example, the optical crossover 600 may include multiple instances of the mode multiplexer 100 depicted in FIG. 1.

As shown, the optical crossover 600 is implemented as a 3×3 crossover. The optical crossover 600 comprises a first optical waveguide 605 that includes a multimode optical waveguide section 610. The first optical waveguide 605 receives the first optical signal 415 as a fundamental mode (TE0) optical signal, which is propagated through the filtering section 160-1. Proceeding from left to right in FIG. 6, the optical crossover 600 further comprises the first mode multiplexer 430-1 and the second mode multiplexer 430-2 extending to a side of the first optical waveguide 605, and the first mode demultiplexer 435-1 and the second mode demultiplexer 435-2 extending to the same side of the first optical waveguide 605. The first optical waveguide 505 then extends through a filtering section 160-2.

In the optical crossover 600, the optical signals 415, 420, 425 propagate through the multimode optical waveguide section 610 from left to right. However, alternate implementations may have any of the optical signals 415, 420, 425 propagating in different directions. Further, other ordering of the first mode demultiplexer 435-1, the second mode demultiplexer 435-2, the first mode multiplexer 430-1, and the second mode multiplexer 430-2 is also contemplated.

Thus, the mode multiplexer design may be used to form low-loss, low-crosstalk optical crossovers, such as the optical crossovers 300, 400, 500, 600. By using the filtering section(s) of the mode multiplexer, the mode multiplexer may achieve losses that are less than 0.1 or 0.2 dB and a crosstalk that is less than −27 dB across the O-band. The mode multiplexers and optical crossovers may be configured to operate at other frequencies, e.g., within the C-band.

The optical crossovers may provide a reduced size in one or more dimensions, when compared with optical crossover designs requiring symmetry in multiple dimensions (e.g., in both x and y dimensions). Further, the optical crossovers may use different orders of modes to allow waveguide routing to be more flexible within an optical device. For example, the optical crossovers 400, 500 may provide a same functionality as a star-crossing optical crossover. The mode multiplexers may be implemented using different material types to offer flexible compatibility with a number of different material platforms.

While the optical crossover 300 is depicted as a 2×2 optical crossover, and the optical crossovers 400, 500, 600 are depicted as 3×3 optical crossovers, other configurations of the optical crossovers are also contemplated. For example, the optical crossovers may be implemented as 4×4, 5×5, and so on. Further, although fundamental modes, first order modes, and second order modes are described, operation using higher-order modes is also contemplated.

Figure 7:
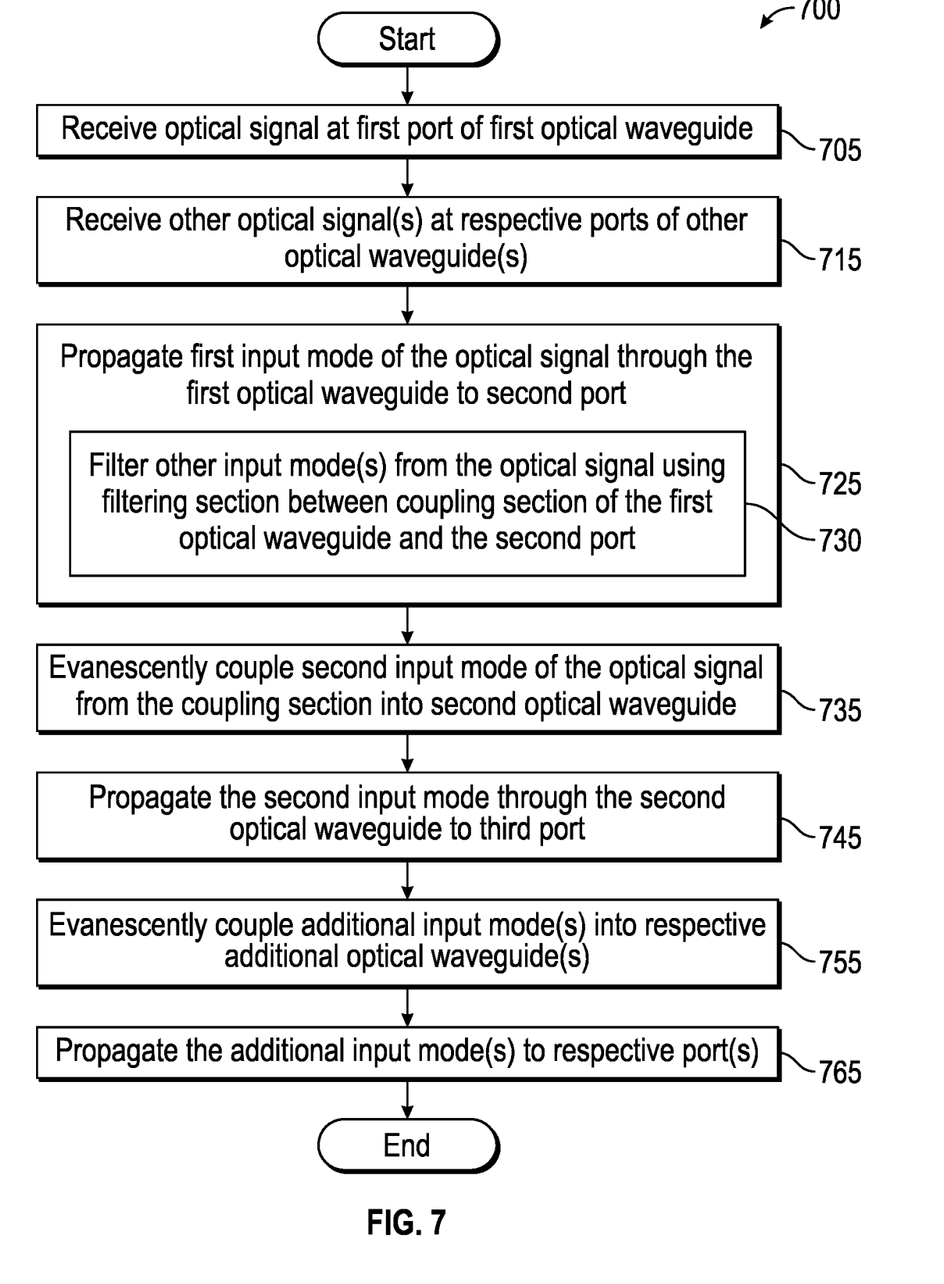
FIG. 7 is a method of communicating using one or more mode multiplexers, according to one or more embodiments.

FIG. 7 is a method 700 of communicating using one or more mode multiplexers, according to one or more embodiments. The method 700 may be used in conjunction with other embodiments. For example, the method 700 may represent operation of the mode multiplexer 100 of FIG. 1 and/or the optical crossovers 300, 400, 500, 600 of FIGS. 3-6.

The method 700 begins at block 705, where an optical signal is received at a first port of a first optical waveguide. At block 715, one or more other optical signals are received at respective ports of one or more other optical waveguides. In some embodiments, the various optical signals are directly (or end-fire) coupled into the respective optical waveguides.

At block 725, a first input mode of the optical signal is propagated through the first optical waveguide to a second port of the first optical waveguide. In some embodiments, the first input mode comprises a fundamental mode of the optical signal, although other input modes are also contemplated. In some embodiments, propagating the first input mode through the first optical waveguide comprises, at block 730, filtering one or more other input modes from the optical signal using a filtering section between a coupling section of the first optical waveguide and the second port. In some embodiments, the first optical waveguide comprises one or more filtering sections (e.g., taper sections and/or S-bend sections) that filter input modes other than the fundamental mode.

At block 735, a second input mode of the optical signal is evanescently coupled from the coupling section into a second optical waveguide. In some embodiments, the second input mode comprises one of a first order mode, a second order mode, and a higher-order mode. At block 745, the second input mode is propagated through the second optical waveguide to a third port of the second optical waveguide.

At block 755, one or more additional input modes are evanescently coupled into a respective one or more additional optical waveguides. At block 765, the one or more additional input modes are propagated to one or more respective ports. In some embodiments, the first input mode, the second input mode, and/or the additional input mode(s) propagate through a multimode optical waveguide section. In some embodiments, the additional input mode(s) are evanescently coupled from the multimode optical waveguide section into the additional optical waveguide(s). The method 700 ends following completion of block 765.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A mode multiplexer comprising:
a first optical waveguide extending between a first port and a second port, wherein a first input mode of an optical signal entering the first port is propagated through the first optical waveguide to the second port; and
a second optical waveguide configured to evanescently couple with a coupling section of the first optical waveguide, wherein a second input mode of the optical signal entering the first port is propagated through the second optical waveguide to a third port,
wherein the coupling section of the first optical waveguide comprises a first taper section arranged adjacent to a second taper section of the second optical waveguide such that the first taper section is evanescently coupled with the second taper section,
wherein the second taper section is inversely tapered relative to the first taper section, and
wherein the first optical waveguide further defines a filtering section between the coupling section and the second port, the filtering section configured to filter the second input mode.

2. The mode multiplexer of claim 1, wherein the filtering section comprises a third taper section that tapers away from the coupling section toward the second port.

3. The mode multiplexer of claim 2, wherein the filtering section further comprises an S-bend section between the third taper section and the second port.

4. The mode multiplexer of claim 1, wherein the first input mode comprises a fundamental mode of the optical signal, and the second input mode comprises a first order mode of the optical signal.

5. An optical crossover comprising:
a first optical waveguide extending between a first port and a second port, wherein a first input mode of a first optical signal entering the first port is propagated through the first optical waveguide to the second port, wherein the first optical waveguide comprises a multimode optical waveguide section;
one or more mode multiplexers, each defining a respective second optical waveguide that is configured to evanescently couple an input mode of a respective input optical signal onto a respective mode of the multimode optical waveguide section that is distinct from the first input mode; and
one or more mode demultiplexers, each defining a respective third optical waveguide that is configured to evanescently couple a respective mode of the multimode optical waveguide section onto an output mode of a respective output optical signal, wherein each second optical waveguide and each third optical waveguide comprises a respective taper section that is arranged adjacent to a respective complementary taper section of the first optical waveguide,
wherein the first optical waveguide further defines a filtering section arranged between the multimode optical waveguide section and the second port, the filtering section configured to filter input modes other than the first input mode.

6. The optical crossover of claim 5, wherein the filtering section comprises a second respective taper section that tapers away from the multimode optical waveguide section toward a respective port of the first port and the second port.

7. The optical crossover of claim 6, wherein the filtering section further comprises an S-bend section arranged between the second respective taper section and the respective port of the first port and the second port.

8. The optical crossover of claim 5, wherein the first input mode is a fundamental mode of the first optical signal, and
wherein, for each of the one or more mode multiplexers, the input mode of the respective input optical signal is a fundamental mode.

9. The optical crossover of claim 8,
wherein a first mode multiplexer is configured to evanescently couple a fundamental mode of the respective input optical signal onto a first order mode of the multimode optical waveguide section,
wherein a second mode multiplexer is configured to evanescently couple a fundamental mode of the respective input optical signal onto a second order mode of the multimode optical waveguide section,
wherein a first mode demultiplexer is configured to evanescently couple the first order mode onto a fundamental mode of the respective output optical signal, and
wherein a second mode demultiplexer is configured to evanescently couple the second order mode onto a fundamental mode of the respective output optical signal.

10. The optical crossover of claim 5, wherein each second optical waveguide and each third optical waveguide extend to a same side of the first optical waveguide.

11. The optical crossover of claim 5, wherein for each mode of the multimode optical waveguide section, a corresponding mode multiplexer of the one or more mode multiplexers and a corresponding mode demultiplexer of the one or more mode demultiplexers are interspersed.

12. The optical crossover of claim 5, wherein the first optical waveguide further defines a second filtering section arranged between the multimode optical waveguide section and the first port, the second filtering section configured to filter input modes other than the first input mode.

13. A method comprising:
receiving an optical signal at a first port of a first optical waveguide;
propagating a first input mode of the optical signal through the first optical waveguide to a second port; and
evanescently coupling a second input mode of the optical signal from a coupling section of the first optical waveguide into a second optical waveguide, wherein the coupling section of the first optical waveguide comprises a first taper section arranged adjacent to a second taper section of the second optical waveguide such that the first taper section is evanescently coupled with the second taper section, wherein the second taper section is inversely tapered relative to the first taper section, wherein the second input mode is propagated through the second optical waveguide to a third port,
wherein propagating the first input mode of the optical signal through the first optical waveguide to the second port comprises filtering the second input mode from the optical signal using a filtering section between the coupling section and the second port.

14. The method of claim 13, wherein the filtering section comprises a third taper section that tapers away from the coupling section toward the second port.

15. The method of claim 14, wherein the filtering section further comprises an S-bend section between the third taper section and the second port.

16. The method of claim 13, wherein the first input mode comprises a fundamental mode of the optical signal, and the second input mode comprises a first order mode of the optical signal.

17. The method of claim 13, wherein the coupling section of the first optical waveguide comprises a multimode optical waveguide section, the method further comprising:
evanescently coupling one or more additional input modes of the optical signal into a respective one or more additional optical waveguides,
wherein propagating the first input mode of the optical signal through the first optical waveguide to the second port comprises filtering input modes other than the first input mode.

* * * * *